INVENTOR.
Robert R. Myers
Attorney

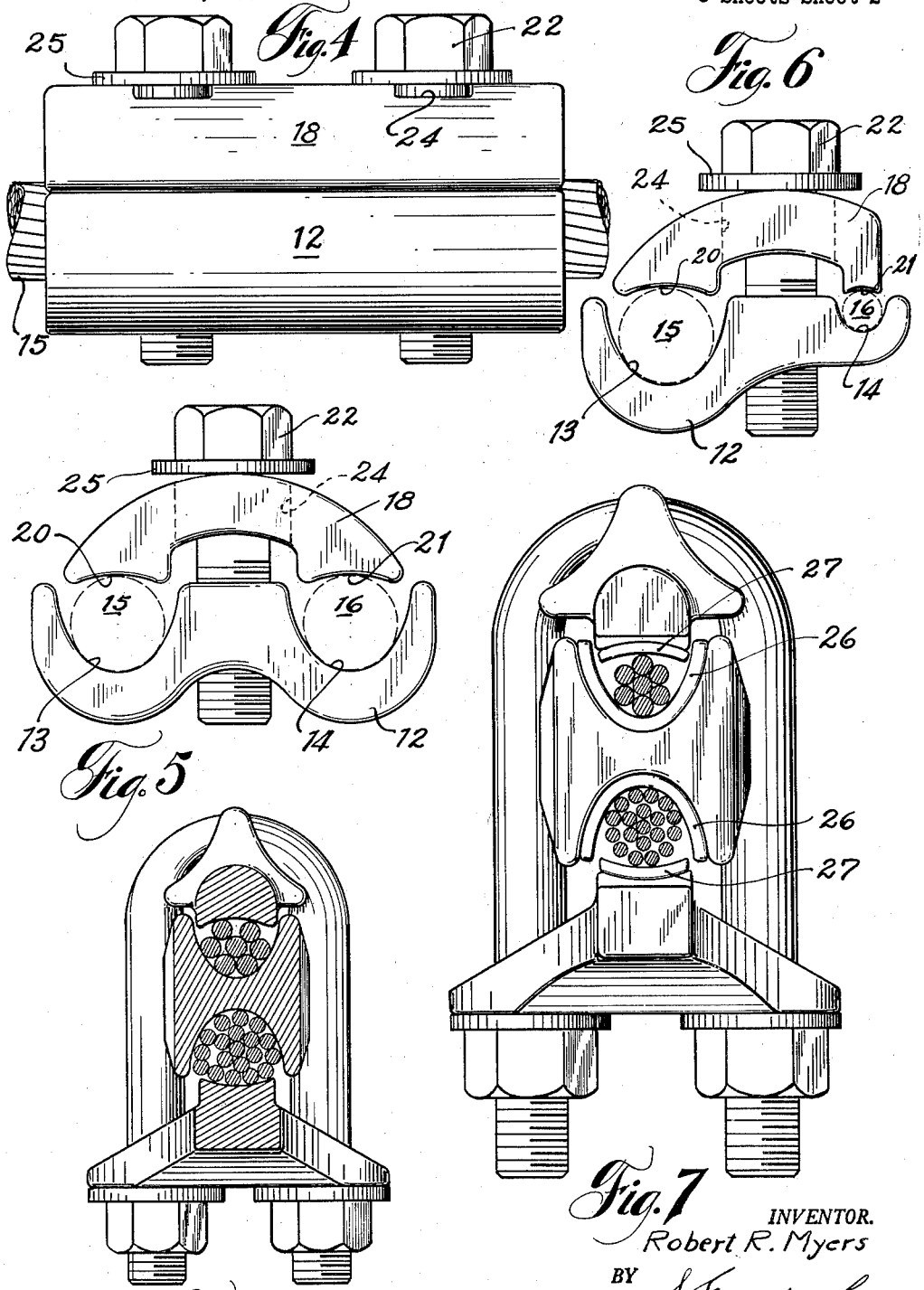

Aug. 13, 1963     R. R. MYERS     3,100,672
CABLE ACCESSORIES

Filed Feb. 26, 1957     3 Sheets-Sheet 3

INVENTOR.
Robert R. Myers
BY
Attorney

United States Patent Office 3,100,672
Patented Aug. 13, 1963

3,100,672
CABLE ACCESSORIES
Robert R. Myers, Port Vue, McKeesport, Pa., assignor to Aluminum Company of America, Pittsburgh, Pa., a corporation of Pennsylvania
Filed Feb. 26, 1957, Ser. No. 642,547
5 Claims. (Cl. 339—265)

This invention relates in general to cable accessories and more particularly to cable-receiving and restraining devices, such as clamps, connectors, dead-ends, snubbers, and the like, which incorporate at least one member having a cable-receiving and restraining groove or recess in adjustable clamping relationship with a pusher member, and capable in terms of a single device of employment with a range of cable sizes or diameters with high cable-restraining efficiencies.

The invention has found particularly successful adaptation in the electrical stranded conductor field in the production of high compression, low electrical resistance connections between the conductors and such accessories. However, the accessories of the invention are applicable to all types of cable structures, including single and multiple parallel rods, helically stranded wire rope and stranded electrical conductors, with and without reinforcing metal strands.

There has been a noticeable reluctance on the part of cable accessory manufacturers to produce and stock the numerous sizes of cable-receiving and restraining accessories required for the various sizes and combinations of cable structures in universal use, with the end result that many cable connections fall far below their required strength and, in the case of electrical conductors, below the desired electrical efficiency. Furthermore, there has been no successful attempt to produce a commercial device of the type herein referred to which has been found to satisfactorily meet the requirements of an acceptable cable-restraining device over a wide range of cable sizes.

An object of the present invention is to provide a cable accessory incorporating a member provided with at least one cable-receiving groove or recess, in association with a cable-engaging pusher member and adjusting clamping means, which function to exert substantial clamping pressure and restraining force on any one of a series or range of cable sizes separately received within a single such combination.

Another object of the invention is to provide formulae to enable accurate dimensioning and reproduction of the cable-embracing surfaces incorporated in the grooved or recessed cable-receiving members and pusher members of the cable accessories of the invention.

Other objects and advantages of the cable accessories falling within the scope of the present invention will be apparent and understood on reference to the following descriptions and illustrations, in which:

FIG. 4 is a side elevational view of a "side-by-side" or "center-bolt" cable accessory;

FIG. 5 is an end elevational view of the cable accessory illustrated in FIG. 4, as employed with cables of equal diameter;

FIG. 6 is an end elevational view similar to FIG. 5, with the exception that two sizes of groove and pusher combinations have been placed in a single accessory;

FIG. 7 is an end elevational view of a modification of the device illustrated in FIG. 2 showing copper bushing inserts incorporated therein;

FIG. 8 is a sectional view taken on the plane 8—8 of FIG. 1, as applied to the cable accessory illustrated in end elevational view in FIG. 2, showing the two cables therein following deformation thereof as a result of normal clamping pressure exerted thereon;

The success and efficiency of the cable accessories of the present invention lie in the discovery that the shape or cross-section of the cable-engaging and embracing surfaces incorporated therein must bear a definite geometric relationship to the cables with which they are employed to insure maximum gripping contact and surface engagement between the contacting surfaces of the accessories and their associated cables. Deformation of the cable can be tolerated within and between its cable-engaging surfaces and is essential to maximum clamping pressure between the same. However, the cable-engaging surfaces, and particularly the surface of the groove in engagement with a cable, must be so proportioned to avoid excessive deformation which would serve to decrease the cross-sectional area of the cable in the immediate vicinity of its clamping. In the case of an electrical conductor, it will be apparent that desired low electrical resistance of a connection between an accessory and conductor, in accordance with the practice of the present invention, will follow where maximum peripheral contact is obtained, particularly between the grooved member of the accessory, as distinguished from the relatively small area of contact between the cable and its complementary pusher member.

Basically and generally, the accessories of the invention comprise a cable-receiving and restraining member including at least one open-channel groove defined by an arcuate concave bottom surface and laterally disposed diverging arcuate concave side walls blended to define a smooth curvilinear surface adapted to embrace a maximum exposed surface of a cable received therein under the influence and clamping force of a pusher member, also preferably provided with a concave arcuate surface in engagement with the cable, and adjustably associated with the grooved cable-receiving and restraining member.

Figures 1, 2, 3:
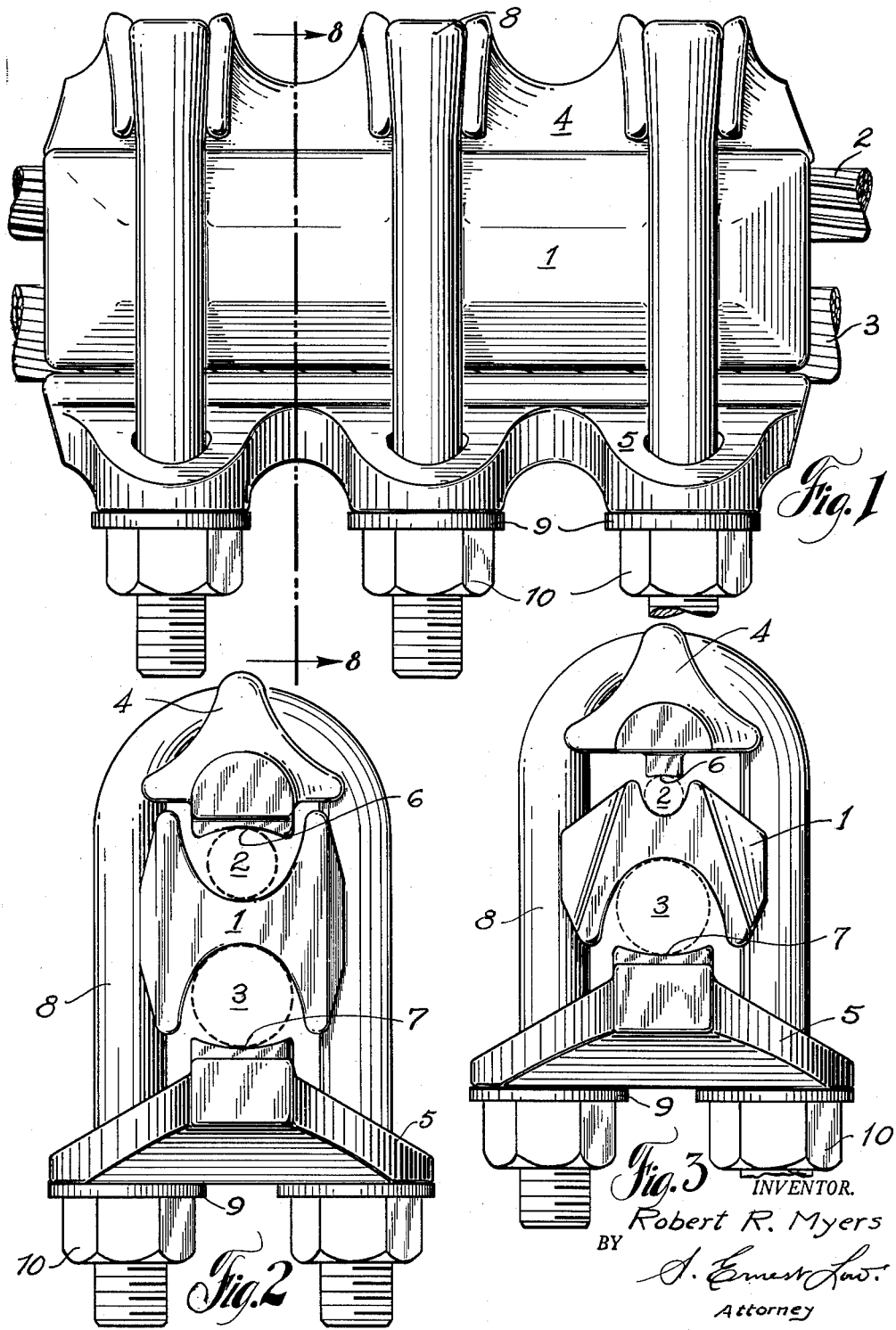
FIG. 1 represents a side elevational view of a U-bolt cable accessory embodying cable-receiving and restraining elements capable of application and use over a range of cable sizes.
FIG. 2 is an end elevational view of the cable accessory illustrated in FIG. 1 as applied to the minimum and maximum cable sizes used in the groove and pusher combination shown.
FIG. 3 is an end elevational view of a modification of the cable accessory illustrated in FIG. 2, wherein two sizes of groove and pusher combinations have been combined in a single accessory.

In more detail and referring to the drawings, FIGS. 1 through 3 illustrate a cable accessory commonly referred to in the art as a U-bolt clamp. Therein, an intermediate grooved cable-receiving member 1 is illustrated embracing a pair of cables 2 and 3 representing the minimum and maximum diameters used in the particular groove and pusher combination (FIG. 2). An accessory incorporating groove and pusher members of different size is shown at FIG. 3. An upper clamping member 4 and a lower clamping member 5 provided, respectively, with pusher surfaces 6 and 7 engage the outer exposed surfaces of the cables 2 and 3. One or more customarily employed U-bolts 8 embrace outer surfaces of the intermediate member 1 and upper clamping member 4, the parallel legs of the U-bolt or U-bolts passing through apertures in the lower clamping member 5, where their threaded extremities receive washers 9 and nuts 10 for adjustably clamping the accessory into clamping engagement with the cables 2 and 3.

Except for the cable-embracing surfaces of the intermediate member 1 and pusher surfaces 6 and 7 of the clamping members 4 and 5, respectively, which will be described in more detail herein after in accordance with the concept of the present invention, FIGS. 1 through 3 are typical of U-bolt connectors for joining the ends of adjacent cables. In the electrical field, and particularly as employed with helically stranded aluminum cable, the entire U-bolt connector is preferably made from aluminum and its alloys. It will be apparent, however, that other suitable metals may be substituted with due consideration being given to the resistivity, conductivity and interaction of the metals selected in any particular case.

It will be understood that the clamping force applied on the cables 2 and 3 is a direct result of running up the nuts 10 on the extended termini of the parallel legs of the U-bolt or bolts 8, the cables being deformed as indicated in the sectional view illustrated in FIG. 8, as will be hereinafter described in more detail.

In FIGS. 4 through 6, a modified form of a cable accessory falling within the scope of the invention has been illustrated. In this particular instance, a cable connector of the "center bolt" or "side-by-side" type is shown. Therein, a lower grooved, cable-embracing member 12, provided with parallel grooves 13 and 14, receives two adjacent parallel cables 15 and 16 of equal size (FIGS. 4 and 5), or unequal size (FIG. 6). An upper clamping member 18, provided with arcuate pusher surfaces 20 and 21, is superimposed over the lower grooved member 12 in each instance (FIGS. 5 and 6) with the concave pusher faces 20 and 21 in engagement with the upper exposed surfaces of the cables 15 and 16. One or more threaded bolts 22 extending through laterally extending oversize apertures 24 in the upper clamping member 18 threadedly engage the lower grooved member 12 and securely attach the cable accessory of FIGS. 4 through 6 on the cables with which it is associated.

The use of the laterally extending oversize apertures 24 and washers 25, underlying the heads of the bolts 22, permit angular adjustment of the clamping members 18 of FIGS. 5 and 6 to accommodate for any slight of intentional dimensional differences in the cables 15 and 16.

FIG. 7 is a specific illustration of the use of copper inserts in the form of bushings or liners 26 and 27 securely attached to the cable-embracing grooved member and arcuate cable-embracing pusher surface, respectively, of any one of the aforedescribed cable accessories, particularly when the cable accessories are employed in the electrical conductor field with a dissimilar metal, such as aluminum accessories with copper conductors. In such an instance, the bushings or liners 26 and 27 are attached to their complementary pusher and cable-receiving grooved surfaces by means of an electrolytically transitional bonding interlayer, to avoid deterioration by electrolytic corrosion. In one method of placing copper bushings in aluminum accessories, solder is applied to the surface, which has been previously heated and cleaned. The copper bushing which has had its surface tinned is then clamped into contact with the solder-coated surface to effect the bond.

The deformation of the cables illustrated in FIG. 8 is typical for any one of the aforementioned cable accessories. Therein, each of the cables has been deformed in such a manner to distribute the individual strands in peripheral surface contact with substantially, if not entirely, the entire periphery of the surface of the grooves in the intermediate cable-receiving member and arcuate cable-embracing pusher surfaces of the upper and lower clamping members. This has accounted for maximum cable-restraining force and high electrical contact efficiency of the cable accessories of the present invention.

Figure 9:
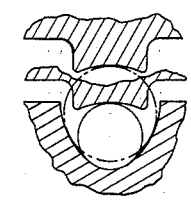
FIGS. 9, 10 and 11 are fragmentary diagrammatic representations of maximum and minimum cables lying in uncompressed relationship between cable-engaging surfaces of grooved and pusher members made in accordance with the invention.
Figure 10:
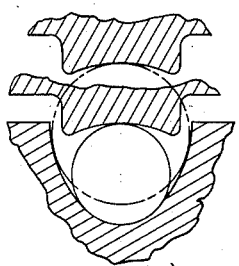
Figure 11:
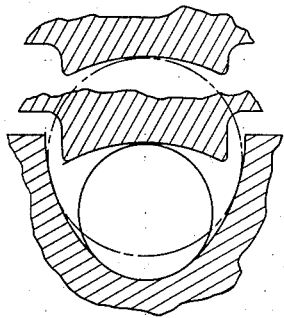

In FIGS. 9 through 11, cable-receiving grooved members have been illustrated in combination and association with pusher members suitable for accommodating three ranges of cable sizes. In these figures, the minimum size cable has been illustrated in full line and the maximum size cable in broken line construction in each instance.

Referring further to FIGS. 9 through 11, and having selected a minimum cable diameter, it has been discovered that it is only necessary to apply the formula:

$Ma = 0.1 + (1.4\ Mi)$ to obtain the maximum diameter of cable that can be associated with a particular cable accessory, within the scope of the present invention, where $Ma$ = the maximum cable diameter, and
$Mi$ = the minimum cable diameter.

Following this simple formula, high strength, high compression connections have been repeatedly accomplished between cables and the accessories of the invention.

Figure 12:
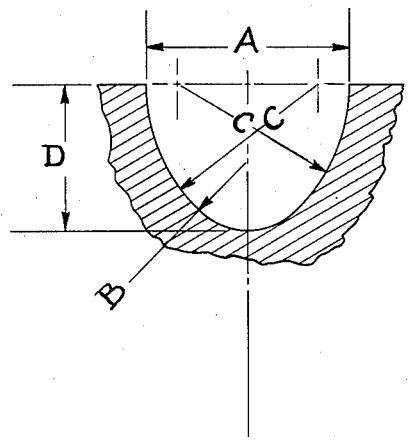
FIG. 12 is a graphical elevational representation of the cable-embracing surface of the grooved member of the invention.

In respect to the form of the concave curvilinear surface defining the cable-receiving grooves appearing in the previously described and illustrated cable accessories, reference is now made to FIG. 12. Therein, a symmetrical groove has been illustrated in its preferred form in terms of the dimensions A, B, C and D; where $A$ = the width of the entrance to the groove, $B$ = the radius of the bottom arcuate surface of the groove, $C$ = the radius of the side walls of the groove, and D the depth of the groove measured from the plane of its entrance to the lowest point on the arcuate bottom surface.

Values for the dimensions A, B, C and D are expressible for any particular range of cable sizes in terms of the maximum and minimum cable diameters for the range, as follows:

$$A = \text{Maximum cable diameter} + \tfrac{1}{32}''$$

$$B = \frac{\text{Minimum cable diameter}}{2} \pm .02''$$

$$C = \frac{Ma + Mi}{2} + \tfrac{1}{32}'', \text{ and}$$

$$D = .7A$$

The values for A, B, C and D are only critical within the normally experienced tolerances allowed and generally accepted in the field of cable manufacture, as well as in the casting, forging, machining and similar practices regularly performed in the manufacture of the several elements of the cable accessories. For example, dimension A for the groove is preferably slightly greater than the maximum diameter cable in a range of the same, as indicated by the $\tfrac{1}{32}''$ added thereto. Also the value of A may be otherwise determined by applying the formula $A = 1.02\ Ma$. In this connection 1.02 Ma is a preferred value for dimension A in the case of the maximum diameter cables in all ranges thereof.

Radius B, on the other hand, may be slightly greater or less than the radius of the minimum diameter cables in ranges thereof in the amount of $+.02''$.

Radii C are also subject to slight variation and although substantially equal to the median of the smallest and largest cable sizes, the value $$C = 1.03 \frac{(Ma + Mi)}{2}$$

gives a result found desirable for tolerance and working purposes.

Regardless of the precise values of A, B, C and D for any particular range of cable sizes, it should be understood that the general shape or surface of the concave groove, and not its precise dimensions as stated above, is the touchstone to the success of the invention. Hence, substantially the values enunciated for the dimensions A, B, C and D are contemplated within the scope of the invention.

Figure 13:
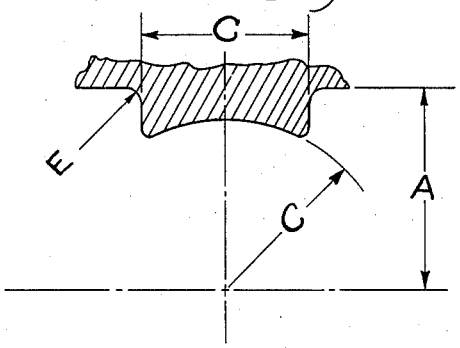
FIG. 13 is a graphical elevational representation of the pusher member made in accordance with the invention.

FIG. 13 graphically illustrates preferred dimensional construction of the pusher member associated with the grooves in the aforedescribed cable accessories. The pusher face is a concave arc struck by the radius C, which is substantially the same as determined above and its width is determined by a chord substantially equal to the radius C. The arcuate cable-embracing surface extends below a shoulder located a distance A above the center from which the arcuate cable-embracing surface was struck. The value of A is determined in the same manner and has substantially the same value as stated for the groove described above, and the shoulder insures uninterrupted entrance of the pusher into its complementary groove over the particular range of cables for which it was designed. The radius E is used to strike an arcuate fillet at the juncture of the pusher with the shoulder, which fillet has been found desirable when the clamping member is made as a casting.

Referring further to the diagrammatic representations of FIGS. 12 and 13, below are shown tables of dimensions which have been used to construct cable accessories in accordance with my invention:

*Cable Range (in inches)*

|  | Min. | Max. |  | Min. | Max. |
|---|---|---|---|---|---|
| G–0 | .162 | .325 | G–3 | .743 | 1.060 |
| G–1 | .292 | .502 | G–4 | 1.060 | 1.545 |
| G–2 | .464 | .743 | G–5 | 1.545 | 2.158 |

*Dimensions*

|  | A | B | C | D | E |
|---|---|---|---|---|---|
| G–0 | 11/32 | 3/32 | 1/4 | 7/32 | 1/32 |
| G–1 | 9/16 | 9/64 | 13/32 | 23/64 | 3/64 |
| G–2 | 13/16 | 1/4 | 5/8 | 17/32 | 1/16 |
| G–3 | 1 1/8 | 3/8 | 15/16 | 25/32 | 3/32 |
| G–4 | 1 9/16 | 17/32 | 1 5/16 | 1 1/8 | 1/8 |
| G–5 | 2 1/8 | 25/32 | 1 7/8 | 1 17/32 | 1/8 |

An advantage is to be seen in the use of a soft, highly-conductive metal for the grooved cable-receiving members of the invention. When pressure is applied to the cable by the pusher, individual strands tend to imbed themselves in the soft metal of the grooved member, thus increasing the area of contact between the cable and the accessory.

An especial advantage has been found in the use of my cable-receiving and restraining elements in "side-by-side" or "center-bolt" clamps such as those shown in FIGS. 4 to 6. It has been known that the upper clamping member 18 tends to "rock" or pivot about its bolt members, thus allowing for variance in the size of the cables joined.

Further, the double arcuate cross section of clamps of the invention, illustrated in FIGS. 5 and 6 have a greatly magnified "spring-follow action," which tends to maintain substantially uniform pressure on the cables. This action results from the tendency of the curvilinear cross-section of the clamps to bend or flex within the elastic limits of the metal used as expansion of the cables occurs due to increase in temperature. As can be seen from FIGS. 5–6, this deformation or spring-follow action can take place about several axes.

It will be seen that the several cable accessories hereinabove described are particularly applicable to stranded conductor, both with and without the reinforcing metal strands commonly used. However, the nature of the accessories permits their use on rods as well with a high degree of electrical efficiency. It will also be readily seen that the concave curvilinear surface of the cable-receiving element in each of the illustrations of the invention permits greater surface contact than that achieved by grooves having straight-line sides, and as previously stated the cable accessories of the invention are adapted to use with mechanical wire cable and rod; in fact, the electrical connector clamps herein described can be used as simple mechanical clamps, if so desired.

As is well understood in the art, the larger the size and the greater the number of bolt members used, and the greater the length of the clamps, higher the mechanical efficiency, up to the point where significant reduction in cross-sectional area of the cable occurs.

Various factors enable substantial cable or rod contact with the groove surfaces. Use of soft rod or cable permits substantial deformation to establish good contact, and similarly the use of soft alloy or metal in the grooved members permits the rod or cable to imbed itself therein.

Although preferred embodiments of my invention have been illustrated and described, many modifications may be made within the spirit of the invention, and it is to be understood that the invention is not limited to the precise details of construction set forth, except as defined in the appended claims.

Having thus illustrated and described my invention, what is claimed is:

1. A cable clamping accessory of low electrical resistance for receiving any one of a range of cable sizes and deformably restraining the same in respect thereto, said accessory comprising a member having at least one symmetrical, open-channel, cable-embracing groove converging from its entrance towards its interior bottom surface, said groove being defined by a smooth concave curvilinear surface the entrance to which substantially equals A, the depth substantially equals D, the bottom surface an arc defined by a radius of substantially B, the oppositely disposed side surfaces each an arc defined by a radius substantially C, where $A$ = maximum cable diameter of the range of cable sizes, $B$ = radius of the minimum cable of the range of cable sizes, $C$ = median of maximum and minimum cable diameters, and $D = 0.7\ A$, a cable-engaging pusher member having a concave cable-engaging surface defined by a radius substantially equal to C, and means adjustably associated with the cable-receiving and cable pusher members for urging and deforming any one of the cables within the range into deformed clamped relationship with the concave curvilinear and arcuate cable-embracing surfaces thereof.

2. A cable clamping accessory of low electrical resistance for receiving any one of a range of cable sizes and deformably restraining the same in respect thereto, in which the range of cables is defined by the formula:

$$Ma = 0.1 + (1.4\ Mi)$$

where $Ma$ equals the maximum and $Mi$ the minimum diameters of the cables within the range, said accessory comprising a member having at least one symmetrical, open-channel cable-embracing groove converging from its entrance towards its interior bottom surface, said groove being defined by a smooth concave curvilinear surface the entrance width of which substantially equals A, the depth substantially equals D, the bottom surface an arc defined by a radius of substantially B, and the oppositely disposed side surfaces each an arc defined by a radius substantially C, where $A$ = maximum cable diameter of the range of cable sizes, $B$ = radius of the minimum cable of the range of cable sizes, $C$ = median of maximum and minimum cable diameters, and $D = 0.7\ A$, a cable-engaging pusher member having a concave cable-engaging surface defined by a radius substantially equal to C, and means adjustably associated with the cable-receiving and cable pusher members for urging any one of the cables within the range into deformed clamped relationship with the concave curvilinear and arcuate cable-embracing surfaces thereof.

3. A cable accessory for clamping attachment in surface engagement with a deformable cable, said accessory comprising a cable-receiving member and a pusher member, said cable-receiving member having a symmetrical axially coextensive groove sunk into the same from a surface defining the entrance plane to the groove, the transverse surface of the groove being defined throughout its length by a bottom arc and lateral side arcs smoothly blended therewith to provide a concave curvilinear cable-engaging surface, the bottom arc being struck from a radius centered on the axis of symmetry of the groove below the plane of entrance thereto and each lateral side arc being struck from a radius centered on a side of the axis of symmetry of the groove remote to the arcuate surface defined thereby, said groove having a maximum transverse dimension in the plane of entrance thereto and the depth of the groove from its plane of entrance being less than its maximum transverse entrance dimension, the pusher member having a transverse concave curvilinear cable-engaging surface in oppositely disposed relationship to the concave curvilinear cable-engaging surface of the groove in the cable-receiving member, the transverse width of the concave curvilinear cable-engaging surface of the pusher member being less than the transverse entrance dimension to the groove in the cable-receiving member, and means associated with the cable-receiving and pusher members for adjustably moving said members relatively to each other.

4. A cable clamping accessory capable of receiving a deformable cable within a range of cable sizes and restraining any selected cable size within the range in low electrical resistance clamped relationship, said accessory comprising a cable-receiving member having at least one symmetrical open-channel cable-embracing groove defined by a smooth concave curvilinear surface composed of a bottom arcuate surface of a radius substantially equal to the radius of the smallest diameter cable of the range of cable sizes in smooth curvilinear blended concave relationship with laterally oppositely disposed concave arcuate surfaces each having a radius substantially equal to the median of the diameters of the smallest and largest cables within the range of cables sizes, said open-channel cable-embracing groove having its maximum transverse cross-sectional dimension across the open-channel entrance thereto, a pusher member having a concave cable-engaging surface freely enterable within the opeen-channel entrance to the cable-embracing groove a distance sufficient to deformably compress the smallest diameter cable in the range of cable sizes into substantial peripheral length engagement of the cable with the concave curvilinear surface of the cable-embracing groove, means associated with the cable-receiving and cable pusher members for assembling the same with their concave surfaces facing each other, and said means permitting adjustment of the cable-receiving and cable pusher members into deforming engagement with any selected cable therebetween within the range of cable sizes.

5. A cable clamping accessory capable of receiving a deformable cable within a range of cable sizes and restraining any selected cable within the range in low electrical resistance clamped relationship, said accessory comprising a cable-receiving member having at least one symmetrical open-channel cable-embracing groove defined by a smooth concave curvilinear surface composed of a bottom arcuate surface of a radius substantially equal to the radius of the smallest diameter cable in the range of cable sizes centered on the axis of symmetry of the groove in smooth curvilinear blended concave relationship with laterally oppositely disposed concave arcuate surfaces each having a radius substantially equal to the median of the diameters of the smallest and largest cables within the range of cable sizes, each of said last-mentioned radii being centered in the plane of the open-channel entrance to the cable-embracing groove and on a side of the axis of symmetry thereof remote to the arcuate surface defined thereby, the groove having its maximum transverse cross-sectional dimension across the open-channel entrance thereto, a pusher member having a concave cable-engaging surface freely enterable within the open-chanel entrance to the cable-embracing groove a distance sufficient to deformably compress the smallest diameter cable in the range of cable sizes into substantial peripheral length engagement of the cable with the concave curvilinear surface of the cable-embracing groove, means associated with the cable-receiving and cable pusher members for assembling the same with their concave surfaces facing each other, and said means permitting adjustment of the cable-receiving and cable pusher members into deforming engagement with any selected cable therebetween within the range of cable sizes.

References Cited in the file of this patent

UNITED STATES PATENTS

| | | |
|---|---|---|
| 1,942,341 | Mangin | Jan. 2, 1934 |
| 2,132,843 | Borden | Oct. 11, 1938 |
| 2,304,807 | Donoghue | Dec. 15, 1942 |
| 2,396,119 | O'Neil | Mar. 5, 1946 |
| 2,691,772 | Hixon | Oct. 12, 1954 |
| 2,771,591 | Vordtriede | Nov. 20, 1956 |

FOREIGN PATENTS

| | | |
|---|---|---|
| 715,977 | Germany | Jan. 10, 1942 |

OTHER REFERENCES

Germany, P9999 VIII b/21c, Oct. 27, 1955.